Patented Jan. 19, 1937

2,068,154

REISSUED

UNITED STATES PATENT OFFICE 2,068,154

EARTHENWARE BODY

Ira Elmer Sproat, Westport, Conn., assignor to R. T. Vanderbilt Company, Incorporated, New York, N. Y., a corporation of New York No Drawing. Application October 30, 1935, Serial No. 47,413

8 Claims. (Cl. 106—11)

This invention relates to the manufacture of earthenware bodies and provides improved earthenware bodies characterized by improved properties, particularly decreased moisture expansion and tendency to craze. The invention is an improvement in the earthenware bodies of my prior Patent 1,984,163.

Earthenware bodies have commonly been made of clay, flint and feldspar as the principal ingredients, using, for example, 9 to 11% of feldspar, 33 to 39% of flint and about 50% of clay, partly ball clay and partly china clay. In my prior Patent No. 1,984,163 I have described improved earthenware bodies, in the manufacture of which a substantial amount of pyrophyllite is employed.

It is a well established fact that most ceramic bodies expand upon absorbing moisture, causing crazing of the glaze. Earthenware bodies such as semi-porcelain dinnerware have, for example, an absorption of about 6% to 10%, while wall tile usually has a greater moisture absorption, varying, for example, from about 12% to 19%. Wall tile, with its higher water absorption, is subject to this type of crazing far more than bodies with a lower moisture absorption, and this is especially true of wall tile which is glazed on one side only and where the wall tile is subjected to conditions where it has a good opportunity of absorbing moisture in service. One of the serious objections to moisture absorption in earthenware bodies as heretofore made has been the moisture expansion of the body, although moisture absorption and moisture expansion do not seem to be directly related.

I have found that, in the manufacture of earthenware bodies with pyrophyllite, such as described in my prior Patent No. 1,984,163, the moisture expansion of the body can be greatly decreased by the addition of small amounts of calcium in making the bodies and that the resulting decrease in moisture expansion in turn decreases the tendency to craze.

A common method of testing for moisture expansion is to subject the earthenware body to a steam pressure of about 150 pounds for about 7 hours. When a clay-flint-feldspar earthenware body is subjected to such test it shows, for example, a moisture expansion of about 0.12%. With earthenware bodies made with the addition of pyrophyllite, such as described in my prior patent, I have obtained, by a similar test, an expansion of about 0.08%. By the addition of calcium oxide to such pyrophyllite bodies I have found that the moisture expansion can be still further materially reduced below 0.04% and even as low as 0.03% or 0.02% or lower.

The addition of calcium to the usual clay-flint-feldspar mixture, in making earthenware bodies, is objectionable since the calcium has a tendency to cause sudden fusion and shortens the firing range of the body. When, however, the lime is added together with pyrophyllite, the firing range is not decreased to any great extent, particularly when feldspar is not used or when it is used only to a small extent.

The calcium added to the mixture in making the new ceramic bodies may be added in the form of various calcium compounds, such as limestone, dolomite, fluorite, apatite, calcite, whiting, marble or precipitated calcium carbonate; or it can be added as an impurity in clays, talcs, or other material; or it can be added as a silicate such as augite, dauburite, laumonite, malacolite, mienite, or other lime bearing minerals.

The amount of calcium added can be varied. An improvement in moisture expansion has been found with as little as 0.1% of calcium oxide, but for practical purposes I consider it important to use a materially greater amount in excess of 0.5% or 1%; and for best practical results I have found it desirable to use around 2 or 3% of calcium oxide or its equivalent. In general the amount of calcium oxide or its equivalent should not exceed about 5.0% of the mixture employed, for best results.

The amount of pyrophyllite used in making the new bodies will usually be an amount representing a considerable proportion of the total mixture. While improved results are obtained with as little as 5% or 10% of pyrophyllite, I have found it advantageous to use higher amounts, in excess of 25%, and particularly around 35 to 50% of pyrophyllite.

In general the amount of feldspar used should be small or feldspar should be omitted entirely. A small amount of feldspar aids in the firing but tends to give increased moisture expansion and to restrict the firing range. In general the feldspar should be less than 5% of the mixture and for best results should not exceed around 2 to 3%.

The proportion of clay used in the new composition can also be varied. For example, from 35 to 55%, this clay being made up in part of ball clay and in part of china clay or Georgia kaolin.

Flint is a desirable constituent of the composition and the amount of flint may vary for example from 10 to 30%, using the higher percentages of flint where the pyrophyllite percentage is low.

With high percentages of pyrophyllite both the feldspar and the flint can be considerably reduced in amount.

While the calcium can be added in the form of various available calcium compounds, the best results appear to be obtained if the calcium is introduced into the body by the use of several different compounds containing it. A combination of a lime-bearing talc and whiting gives excellent results.

In making earthenware bodies with the use of pyrophyllite, I have found that a pink cast is sometimes imparted to the ware when fired below cone 10; and I have found that the addition of a small amount of magnesium carbonate, particularly precipitated magnesium carbonate or crude magnesite, improves the color of the resulting ware. A magnesium oxide content in the resulting body of from 0.5% to 5% appears to give best results. To a certain extent the magnesium oxide used supplements the calcium compounds in giving to the resulting ware improved properties.

The invention will be further illustrated by the following tabulation of examples or formulae showing compositions suitable for use in making the new bodies.

|  | Percent | Percent | Percent | Percent |
| --- | --- | --- | --- | --- |
| Flint | 14.0 | 13.0 | 15.0 | 15.0 |
| Feldspar | 3.0 | 3.0 | 2.0 | 2.0 |
| Ball clay | 18.0 | 18.0 | 20.0 | 18.0 |
| Georgia kaolin | 18.0 | 18.0 | 20.0 | 18.0 |
| Pyrophyllite | 40.0 | 40.0 | 35.0 | 42.0 |
| Whiting | 1.0 | 2.0 | 4.0 |  |
| Magnesite | 1.0 | 1.0 | 2.0 | 1.0 |
| Lime bearing talc | 5.0 | 5.0 | 2.0 |  |
| Malacolite |  |  |  | 4.0 |

The manufacture of the earthenware bodies can be carried out in accordance with the customary procedure with formulas now used, that is, with the addition of the necessary amount of water and forming the mass into a plastic condition, which is then prepared in the customary way for firing.

The firing of the new earthenware bodies is carried out at temperatures and for periods of time corresponding to from cone 3 to cone 11, and particularly at around cone 9. The time factor or the rate of firing, as well as the temperature to which the earthenware bodies are subjected, are important; and the firing can better be described by reference to the cones, in accordance with customary ceramic practice, rather than by reference to the temperatures alone.

With compositions containing magnesium carbonate the improvement in color is not obtained to a marked extent at around cones 3 to 5 but is attained at higher temperatures, around cone 9. While I do not wish to limit myself by any theoretical explanation of the action of the magnesium carbonate in improving the color, I have been led to believe that the color is due to organic matter and that the magnesium carbonate at higher temperatures removes or changes the organic matter which otherwise would impart a color to the product.

Earthenware bodies of the present invention may be subjected to subsequent glazing, according to customary methods of applying the glaze to earthenware bodies.

The new earthenware bodies of the present invention are characterized by decreased moisture expansion and decreased tendency to craze. Even though the moisture absorption of the bodies may not be materially reduced as compared with earthenware bodies made without the addition of calcium, the moisture expansion is nevertheless materially reduced. Earthenware bodies can thus be readily obtained having a moisture expansion below 0.04% and particularly below 0.03%, and may be around 0.02% or lower.

I claim:

1. Glazed, semi-vitreous, earthenware bodies having a bisque made from a mixture comprising clay from the class consisting of ball clays, kaolins and china clay, and pyrophyllite, both in substantial amount, and a small percentage of a calcium compound sufficient to impart decreased moisture expansion in the resulting body, the amount of calcium compound being greater than that occurring naturally in the pyrophyllite and clay and between about 0.5 and 5%.

2. Glazed, semi-vitreous, earthenware bodies having a bisque made from a mixture comprising from about 35 to 55 percent of clay from the class consisting of ball clays, kaolins and china clay, from about 5 to 50 percent of pyrophyllite, less than 5 percent of feldspar, from about 10 to 30 percent of flint, and a small percentage of a calcium compound sufficient to impart decreased moisture expansion in the resulting body, the amount of calcium compound being greater than that occurring naturally in the pyrophyllite and clay and between about 0.5 and 5 percent.

3. Glazed, semi-vitreous, earthenware bodies having a bisque made from a mixture comprising from about 35 to 55 per cent of clay from the class consisting of ball clays, kaolins and china clay, from about 35 to 50 percent of pyrophyllite, less than about 5 percent of feldspar and a small percentage of a calcium compound sufficient to impart decreased moisture expansion in the resulting body, the amount of calcium compound being greater than that occurring naturally in the pyrophyllite and clay and between about 0.5 and 5 percent.

4. Glazed, semi-vitreous, earthenware bodies having a bisque made from a mixture comprising ball clay, china clay, pyrophyllite, flint and at least one calcium compound, the pyrophyllite being present in an amount of more than about 10 percent of the mixture and the calcium compound being present in an amount sufficient to impart decreased moisture expansion in the resulting body and in an amount greater than that occurring naturally in the pyrophyllite and clay and between about 0.5 and 5 percent of the mixture.

5. Glazed, semi-vitreous earthenware bodies having a bisque made from a mixture comprising ball clay, china clay, pyrophyllite, flint, at least one calcium compound and magnesium carbonate, the pyrophyllite being present in an amount of more than about 10 percent of the mixture, the magnesium carbonate being present in an amount of from about 0.5 to 5 percent and the calcium compound being present in an amount sufficient to impart decreased moisture expansion in the resulting body and in an amount greater than that naturally occurring in the pyrophyllite and clay and between about 0.5 and 5 percent of the mixture.

6. Glazed, semi-vitreous earthenware bodies having a bisque made from a mixture comprising clay from the class consisting of ball clays, kaolins and china clay, and pyrophyllite, both in substantial amounts, together with at least one calcium compound and magnesium carbonate, the calcium compound and the magnesium carbonate being present in an amount sufficient to impart decreased moisture expansion in the resulting body and in amounts greater than that occurring naturally in the pyrophyllite and clay and in amounts corresponding to from about 0.5 to 5 percent of the calcium oxide and magnesium oxide.

7. Glazed, semi-vitreous, earthenware bodies, having a bisque made from a mixture comprising clay from the class consisting of ball clays, kaolins and china clay, pyrophyllite and a small percentage of a calcium compound, the amount of the calcium compound being greater than that occurring naturally in the pyrophyllite and clay and in an amount such that after firing the bisque will have a moisture expansion of less than 0.04 percent when subjected to 150 pounds steam pressure for seven hours.

8. Glazed, semi-vitreous, earthenware bodies, having a bisque made from a mixture comprising clay from the class consisting of ball clays, kaolins and china clay, pyrophyllite and a small percentage of a calcium compound, the amount of the calcium compound being greater than that occurring naturally in the pyrophyllite and clay and in an amount such that after firing the bisque will have a moisture expansion of less than 0.03 percent when subjected to 150 pounds steam pressure for seven hours.

IRA ELMER SPROAT.